Dec. 31, 1929.                J. N. NELSON                1,741,199
                          OPHTHALMIC MOUNTING
                          Filed Nov. 22, 1927
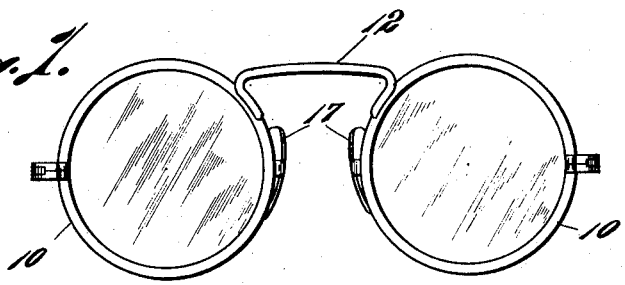
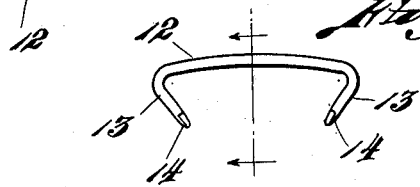
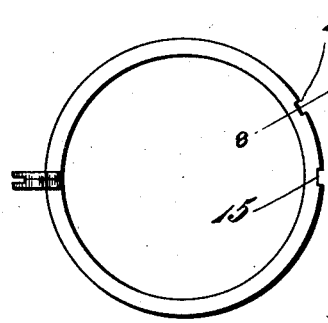
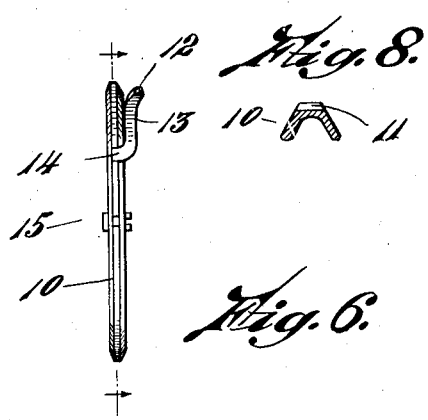
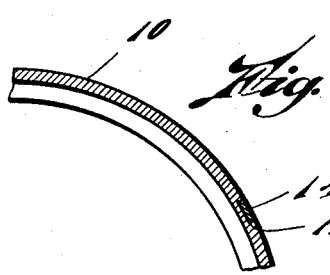
INVENTOR.
John N. Nelson.
BY Barbour & Barlow
ATTORNEYS.

Patented Dec. 31, 1929

1,741,199

UNITED STATES PATENT OFFICE

JOHN N. NELSON, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND

OPHTHALMIC MOUNTING

Application filed November 22, 1927. Serial No. 234,973.

This invention relates to an improved construction of ophthalmic mounting; and has for its object to provide in such a mounting a pair of spaced eye wires notched on their adjacent peripheries at a point above the medial line thru the eyewires. These eyewires are connected by a bridge member having downwardly-extending arms shaped to lie substantially parallel with that portion of the eyewire in proximity thereto, the extremities of the arms being folded to extend laterally into corresponding notches in the eyewires to be soldered therein, whereby the body of the bridge is offset laterally from the plane of the eyewires whereby the arms of the bridge by being in substantial alignment with the eyewires renders them less conspicuous.

With these and other objects in view, the invention consists of certain novel features of construction, as will be more fully described, and particularly pointed out in the appended claims.

In the accompanying drawings:

Fig. 1 is a front view of my improved ophthalmic mounting showing the bridge and the arms thereof positioned to extend in alignment with the adjacent portions of the eyewires.

Fig. 2 is an edge view of the mounting showing the bridge member as offset forwardly from the plane of the eyewires.

Fig. 3 is a detailed view of one of the eyewires showing the same notched at a point above the medial line to receive the offset end of the bridge member and notched substantially on the medial line to receive the arm of the noseguard.

Fig. 4 is a rear view of the bridge member.

Fig. 5 is a fragmental portion showing an edge view of one of the arms of the bridge member with its end turned to extend substantially at right angles to the arm.

Fig. 6 shows the rearwardly turned end of the bridge as secured in a notch in the eyewire.

Fig. 7 is an enlarged view showing the rearwardly turned end of the bridge as inserted into the notch in the eyewire and substantially flush with the periphery thereof.

Fig. 8 is a section on line 8—8 of Fig. 3 thru the notch in the eyewire.

It is found in the practical construction of ophthalmic mountings where it is desired to offset the bridge member to one side of the plane of the eyewires to form the bridge member in substantially U-shape and having its side arms shaped to follow the contour of the eyewires, and when offset forwardly from this plane to line up with the curvature of the eyewires so as to render the bridge arms less conspicuous and to turn the extremities of these arms rearwardly to extend into the peripheral notches of the eyewires, which notches serve to locate these ends and provide a surface for soldering; also these notches serve to countersink the ends of the bridge so that these ends will be substantially flush with the outer surface of their eyewires; and the following is a detailed description of the present embodiment of the invention and showing one construction by which these advantageous results may be accomplished:

With reference to the drawings, 10 designates the eyewires which in this particular case are represented as being of metal and substantially of V-shape in cross section, as illustrated in Fig. 8. These eyewires are each notched as at 11 on its adjacent periphery at a point somewhat above the medial line thru them.

In order to connect together the eyewires in spaced relation, I have provided a bridge member 12 substantially in U-shape, the side arms 13 of which extend downwardly and are shaped to conform substantially to that of the adjacent portion of the eyewire so that when offset forwardly from the plane of these eyewires, these side arms will lie substantially in line with the eyewires so as to render these arms quite inconspicuous.

End portions 14 of these arms are shown in the drawings as being turned rearwardly and reduced to fit snugly into the notches 11 where they are securely soldered. I preferably form these notches of sufficient depth and the rearwardly turned end of such a thickness that when positioned in the notch their outer surfaces will come substantially flush with the periphery of the eyewires thus rendering the attachment of these ends very neat and inconspicuous.

In some instances, I also notch the periphery of the eyewire as at 15, substantially on the medial line between these eyewires for the reception of the arms 16 of the noseguards 17.

I have shown and described the bridge member as being offset forwardly from the plane of the eyewires but by my improved construction and the same general arrangement of parts, the bridge member may be offset to the rear of the plane of these eyewires equally as well as forward of such plane, if desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An ophthalmic mounting having a pair of spaced metal eyewires notched on their adjacent peripheries each at a point above the medial line thru the eyewires, and a wire bridge member of substantially U-shape having downwardly-extending arms shaped along their length to lie substantially parallel with that portion of the eyewire in proximity thereto, the extremity of each arm being folded to extend substantially at right angles thereto into the corresponding notch in its eyewire to be soldered therein to connect said eyewires together and offset the bridge laterally out of the plane of said eyewires.

2. An ophthalmic mounting having a pair of spaced metal eyewires notched on their adjacent peripheries each at a point above the medial line thru the eyewires, a wire bridge member connecting said wires offset forwardly of the plane of said wires, said bridge having downwardly-extending side arms shaped to conform to the curvature of and lie substantially parallel with that portion of the eyewires in proximity to said arms, the extremities of said arms being folded to extend rearwardly into said notches and secured therein, and a bendable noseguard supporting arm secured to each eyewire below the attached end of the bridge.

In testimony whereof I affix my signature.

JOHN N. NELSON.